United States Patent [19]
Genuit et al.

[11] 3,743,924
[45] July 3, 1973

[54] DUAL VOLTAGE REGULATOR

[75] Inventors: Luther L. Genuit, Scottsdale; Robert B. White, Phoenix, both of Ariz.

[73] Assignee: Honeywell Information Systems Inc., Waltham, Mass.

[22] Filed: July 3, 1972

[21] Appl. No.: 268,412

[52] U.S. Cl............... 323/22 T, 307/1 S, 307/34, 307/39, 323/8, 323/22 SC, 321/2
[51] Int. Cl............................. H02j 1/14, G05f 1/64
[58] Field of Search .................. 323/8, 16, 19, 20, 323/22 T, 22 SC; 307/11, 12, 15, 17, 31–36, 38–39, 85, 86; 321/2

[56] References Cited
UNITED STATES PATENTS

| | | |
|---|---|---|
| 3,090,905 | 5/1963 | Ehret............................ 323/22 T |
| 3,273,042 | 9/1966 | Tuszynski........................ 307/17 |
| 3,287,623 | 11/1966 | Valancius........................ 323/22 T |
| 3,581,104 | 5/1971 | Thew............................... 307/15 |
| 3,660,672 | 5/1972 | Berger et al..................... 307/17 |

Primary Examiner—Gerald Goldberg
Attorney—Lloyd B. Guernsey et al.

[57] ABSTRACT

A pair of amplifiers and an equalizer circuit connected to a pair of voltage output terminals in a switching regulator sense the voltage between each of the output terminals and ground. A first amplifier senses the value of the voltage delivered to a first output terminal by the switching regulator and supplies a signal which causes the voltage at the first output terminal to remain constant. A second amplifier senses the relative values of voltages at the first and second output terminals and develops a signal which causes the equalizer circuit to provide a constant ratio of voltages at the two output terminals of the switching regulator.

5 Claims, 3 Drawing Figures

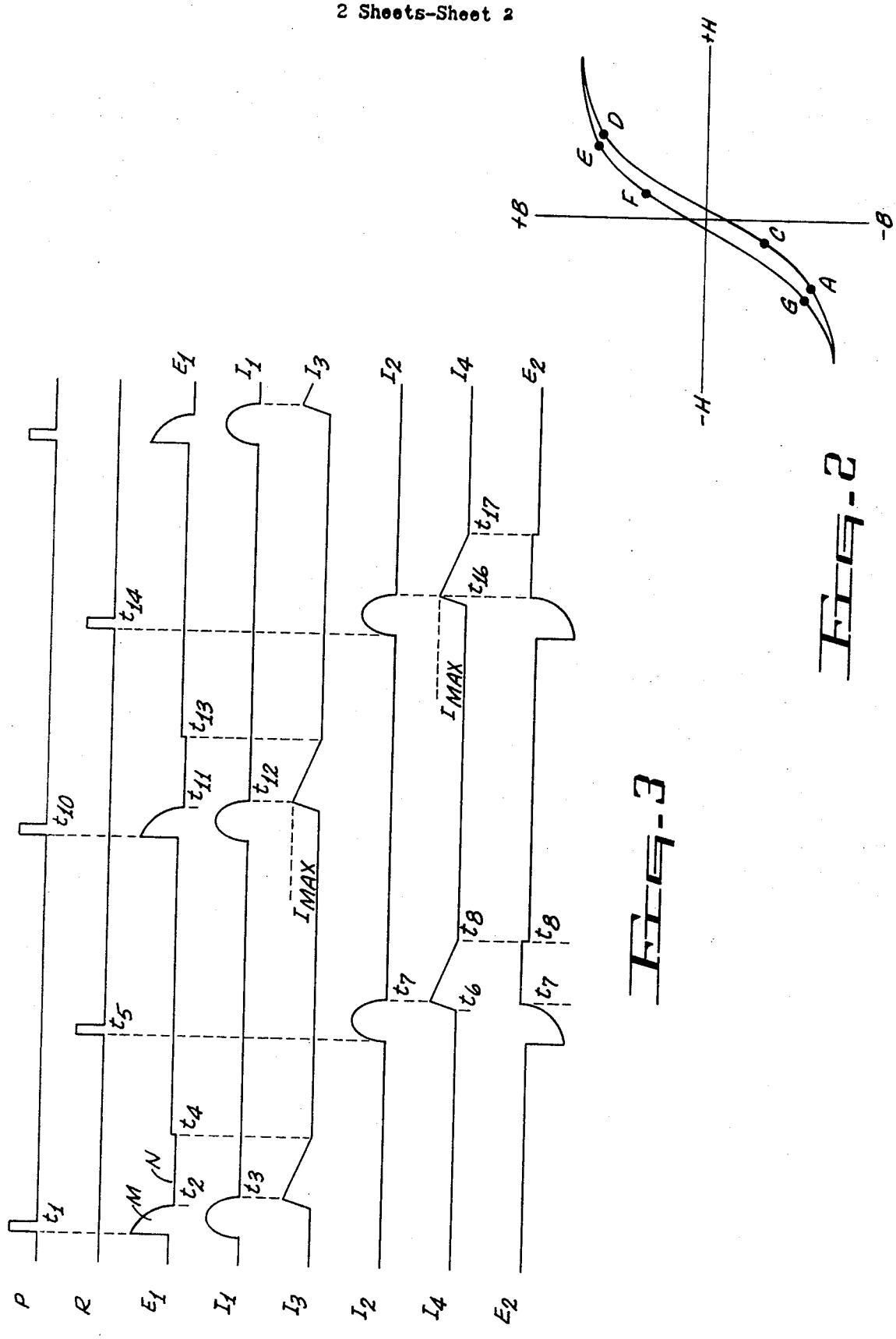

DUAL VOLTAGE REGULATOR

CROSS REFERENCE TO RELATED APPLICATIONS

A detailed description of the operation of the error amplifier can be found in the U.S. Pat. No. 3,707,684 by John R. Nowell, issued Dec. 26, 1972, entitled Error Amplifier for Use with a Switching Regulator. A detailed description of the operation of the rate generator can be found in the U.S. Pat. No. 3,697,853 by John R. Nowell et al. issued Oct. 10, 1972, entitled Pulse Generator for Use with a Switching Regulator. A detailed description of the operation of the trigger generator can be found in the U.S. Patent application by Luther L. Genuit and John R. Nowell filed Oct. 19, 1971, entitled "Trigger Generator for Switching Regulator" Ser. No. 190,860. A more detailed description of the operation of the switching regulator can be found in the U.S. Pat. No. 3,573,597 by Luther L. Genuit and John R. Nowell, issued Apr. 6, 1971, entitled "High Current Switching Regulator with Overlapping Output Current Pulses."

BACKGROUND OF THE INVENTION

This invention relates to a dual-voltage regulator and more particularly to a regulator which uses a pair of amplifiers and an equalizer circuit to provide two regulated output voltages. A first amplifier senses the value of the voltage delivered by a switching regulator and supplies a signal which causes the voltage at a first output terminal of the regulator to remain constant. A second amplifier senses the relative values of the first and second voltages and develops a signal which causes the ratio of the first and second voltages to remain constant.

In high speed data processing systems switching regulators may be used to provide D.C. power to electronic circuits in the system. These regulators are smaller and more efficient than prior art power supplies so that regulators may be located in cabinets which contain circuits rather than in separate cabinets as required when prior art power supplies are used. Location of regulators near the circuits greatly reduces the length of cables which distribute the current to the circuits and reduce the amount of error signals which may be caused by variations in voltage in long cables.

The switching regulator may employ a pair of transformers, a pair of silicon controlled rectifiers and a source of signal to convert an unregulated D.C. voltage, such as 300 volts, to an accurately regulated D.C. voltage, such as 1 volt. The silicon controlled rectifiers are employed as switches between the source of unregulated D.C. voltage and the transformers. The silicon controlled rectifiers are located on the "high" voltage side of the transformers where the current and power losses in these rectifiers are low, thereby causing the switching regulator to have a high degree of efficiency. The regulated D.C. voltage obtained from the secondary windings on the transformers is supplied to a pair of voltage output terminals. The transformers provide isolation between the regulated D.C. voltage and the source of unregulated D.C. voltage so that a short circuit in a silicon controlled rectifier will not cause damage to the microcircuit modules which provide the load on the switching regulator.

The silicon controlled rectifier is a semiconductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when a pulse of current flows into the gate, the silicon controlled rectifier "fires"; i.e., it is rendered conductive and a current will flow from the anode to the cathode. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual," 4th Edition, 1967, published by the General Electric Company, Syracuse, New York.

A signal source is coupled to the voltage output terminals and develops trigger signals whose frequency is determined by the value of voltage at the voltage output terminal. The trigger signals are coupled to the silicon controlled rectifiers in the switching regulator and cause these rectifiers to deliver energy through the transformers to output filter capacitors which are connected to the voltage output terminal. The signal source senses any change in the value of regulated output voltage and causes a change in the frequency of the trigger signals delivered to the switching regulator.

The signal source includes an error amplifier, a rate generator and a trigger generator. The error amplifier develops a current having a value which is determined by the voltage at the output terminals of the switching regulator. This current is supplied to the rate generator which develops pulses having a frequency which is determined by the value of the current from the error amplifier. The pulses from the rate generator are applied to the trigger generator which develops trigger pulses which are applied to the gates of the silicon controlled rectifiers in the switching regulator.

Prior art switching regulators provide only a single output voltage so that a separate switching regulator is required for each of the voltages which are used in the data processing system. What is needed is a switching regulator that provides more than one output voltage so that the total number of switching regulators in the data processing system may be reduced. Reducing the number of switching regulators in the data processing system makes the system more compact and reduces the cost of construction. The present invention provides a switching regulator having dual output voltages. Each of the output voltages is accurately controlled so that each voltage remains constant.

It is also desirable that the regulator be adjustable so that a wide range of pairs of regulated voltages are available from the regulator. The output voltages in the present invention can be changed by changing the value of resistors in a voltage divider circuit. The circuit of the present invention uses very little power so that the efficiency of the regulator is relatively high.

It is, therefore, an object of this invention to provide a new and improved dual voltage switching regulator.

Another object of this invention is to provide a switching regulator which produces two separate regulated voltages.

A further object of this invention is to provide a switching regulator which can be adjusted to provide a wide range of pairs of regulated voltages.

Still another object of this invention is to provide a dual voltage switching regulator having a relatively high efficiency.

SUMMARY OF THE INVENTION

The foregoing objects are achieved in the present invention by providing a new and improved dual voltage regulator having a pair of output terminals. Each of the output terminals provides a voltage which is regulated with respect to ground. A first amplifier senses the value of voltage between a first output terminal and ground and provides a signal which causes the voltage at the first output terminal of the regulator to remain constant. A second amplifier senses the relative value of the voltages at the first and second output terminals and develops a signal which causes the ratio of the two output voltages to remain constant.

Other objects and advantages of the invention will become apparent from the following description when taken in connection with the accompanying drawings.

BRIEF DESCRIPTION OF THE DRAWINGS

FIG. 2 illustrates a magnetization curve which is useful in explaining the operation of the switching regulator shown in FIG. 1.

FIG. 3 illustrates waveforms which are useful in explaining the present invention.

DESCRIPTION OF THE PREFERRED EMBODIMENT

Figure 1:
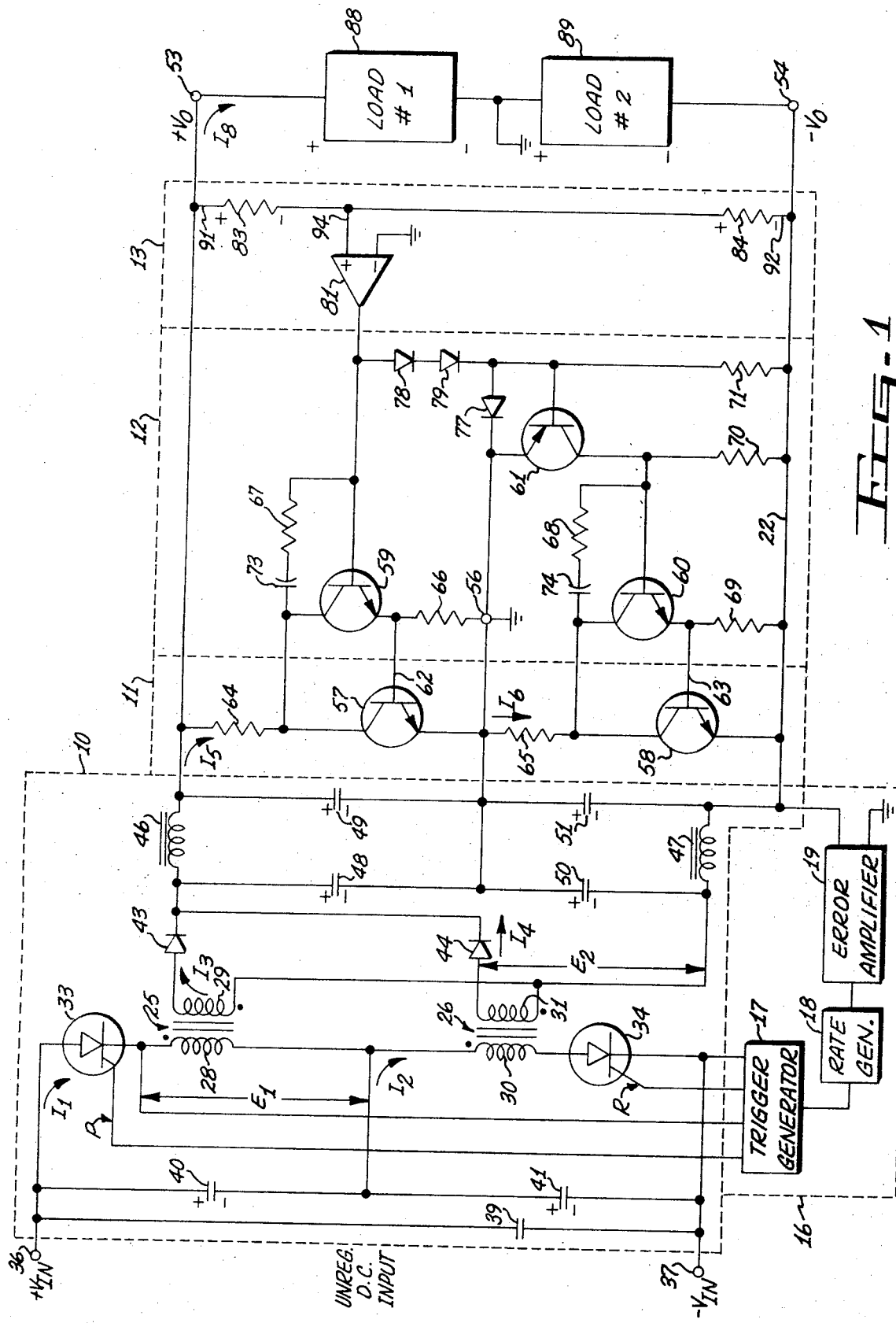
FIG. 1 is a schematic of a switching regulator and its associated control circuits icluding an embodiment of the present invention.

Referring more particularly to the drawings by characters of reference, FIG. 1 discloses a power supply which is designed to provide two constant values of D.C. output voltages for a wide range of values of output current. As indicated in FIG. 1, the system comprises a switching regulator 10, an equalizer circuit 11, a driver amplifier 12, a sense amplifier 13 and a switching regulator control circuit 16 for providing trigger signals to switching regulator 10. The switching regulator control circuit 16 comprises a trigger generator 17, a rate generator 18 and an error amplifier 19. The error amplifier 19 detects any change in voltage at the negative output terminal of the switching regulator and provides a signal whose value is determined by the change in the output voltage. The signal from the error amplifier 19 causes the rate generator 18 to develop pulses having a frequency which is determined by the value of the signal from the amplifier 19. Pulses from the rate generator cause the trigger generator 17 to develop trigger pulses for the switching regulator.

The equalizer circuit 11, the driver amplifier 12 and the sense amplifier 13 detect any change in the ratio of the $+V_o$ and $-V_o$ output voltages and provide a signal whose value is determined by the change in the ratio of these two output voltages. The signal from the sense amplifier 13 is amplified by the driver amplifier 12 and applied to the equalizer circuit 11 which equalizes the current to the first and second output terminals so that the desired ratio of output voltages is obtained.

SWITCHING REGULATOR

As indicated in FIG. 1, switching regulator 10 includes a pair of transformers 25 and 26, each having a primary winding and a secondary winding. The primary windings 28 and 30 are connected in series and are coupled to the high voltage unregulated D.C. power supply having a positive input terminal 36 and a negative input terminal 37. A pair of silicon controlled rectifiers 33 and 34 control the current supplied by the power supply to the primary windings of transformers 25 and 26. The anode of silicon controlled rectifier 33 is connected to the positive terminal 36 of the unregulated D.C. power supply and the cathode of silicon controlled rectifier 33 is connected to the upper end of primary winding 28. The gate of silicon controlled rectifier 33 is connected to one lead of the trigger generator 17 which provides trigger signals to render rectifier 33 conductive. The anode of silicon controlled rectifier 34 is connected to the lower end of primary winding 30 and the cathode of silicon controlled rectifier 34 is connected to the negative terminal of the unregulated D.C. power supply. A second lead from the trigger generator 17 is connected to the gate of silicon controlled rectifier 34 to provide trigger signals to render rectifier 34 conductive.

The magnetic core employed in transformers 25 and 26 produces the magnetization characteristics illustrated in the magnetization curve of FIG. 2. The magnetizing force H is equal to the product of the number of turns in a winding on the transformer core and the number of amperes of current for each turn of wire divided by the length of the core. Since the physical length of the particular transformer core is constant the magnetizing force of the transformer is often expressed as the number of amperes times the number of turns, or "ampere-turns." The flux density B is the number of lines of flux per square centimeter of the transformer core and is determined by the value of the magnetizing force and the type of material used in the core. A discussion of the magnetization curves can be found in the text book "Magnetic Circuits and Transformers" by E.E. Staff, M.I.T., 1943, published by John Wylie & Sons, New York, N.Y.

The operation of the circuit of FIG. 1 will now be discussed in connection with the magnetization curve shown in FIG. 2 and the waveform shown in FIG. 4. A pair of capacitors 40 and 41 provide predetermined quantities of electrical energy to the transformers 25 and 26 each time one of the silicon controlled rectifiers 33 and 34 is rendered conductive. Each time one of the silicon controlled rectifiers 33 and 34 is rendered nonconductive the same predetermined quantity of energy is delivered by one of the transformers 25 and 26 through diodes 43 and 44 to filter capacitors 48 and 50. Prior to time $t_1$ shown in FIG. 3, capacitor 40 of FIG. 1 is charged to the polarity shown in FIG. 1. At time $t_1$ a pulse from trigger generator 17 renders silicon controlled rectifier 33 conductive so that the voltage across capacitor 40 is applied to the primary winding 28 of transformer 25 causing a current $I_1$ to flow from the upper plate of capacitor 40 through anode to cathode of rectifier 33, through the primary winding 28 to the lower plate of capacitor 40. Current $I_1$ through primary winding 28 causes a change of flux in the transformer core and causes the operating point to move from point A toward point C of the magnetization curve in FIG. 2. This change in flux produces a voltage across primary winding 28 which limits the rate of increase in current through silicon controlled rectifier 33, thus preventing possible damage to rectifier 33. A positive voltage applied to the upper end of primary winding 28 causes the operating point to move upward from point C toward point D. The distance between point C and point D is proportional to the product of the voltage applied to primary winding 28 and the duration of time this voltage is applied.

The voltage applied to primary winding 28 is magnetically coupled through the transformer core to the secondary winding 29. Between time $t_1$ and time $t_2$ secondary winding 29 has a positive polarity of voltage at the lower end of the winding and a negative polarity of voltage at the upper end of the winding. At this time, the voltage across secondary winding 29 causes diode 43 to be back biased so that no current flows through the diode or through the secondary winding 29. Capacitor 40 provides current $I_1$ until this capacitor has discharged at time $t_2$ as shown in waveform $I_1$ of FIG. 3. The area M under the curve of waveform $E_1$ (FIG. 3) between times $t_1$ and $t_2$ of the products of the voltage applied to primary winding 28 and the duration of the time the voltage is applied to this area M represents the total energy stored in the core of transformer 25. When the voltage applied to primary winding 28 has a zero value at time $t_2$ the operating point reaches point D.

At time $t_2$, the energy stored in the core of transformer 25 reverses the polarity of voltage across each of the transformer windings so that a negative polarity of voltage is developed at the upper end of primary winding 28. This negative polarity of voltage at the upper end of primary winding 28 causes the operating point in FIG. 2 to move from point D toward point E and to begin moving toward point A. Again the distance between point E and point A is proportional to the product of the voltage across primary winding 28 and the duration of time this voltage is applied. The area N under the curve of waveform $E_1$ between time $t_2$ and $t_4$ is the sum of the products of the voltage across primary winding 28 and the time this voltage is applied. This area N represents a total energy which the core of transformer 28 returns through the transformer. The voltage across primary winding 28 causes current $I_1$ to charge capacitor 40 to a polarity opposite to the polarity shown in FIG. 1.

The energy in the core of transformer 25 causes the voltage across secondary winding 29 to increase to a value larger than the voltage across filter capacitors 48 and 50 so that a current $I_3$ flows through diode 43 to the upper plate of capacitor 48, from the lower plate of capacitor 48 to the upper plate of capacitor 50, from the lower plate of capacitor 50 to the lower end of secondary winding 29. The energy which is stored in the core of transformer 25 when silicon controlled rectifier 33 conducts is proportional to the difference between the point A and point D on the magnetization curve of FIG. 2; and the energy which is transferred to the secondary winding 29 when silicon controlled rectifier 33 is rendered nonconductive, is proportional to the difference between the flux at point E and point A.

Since the distance between point A through point C to point D shown in FIG. 2 is substantially the same as the distance between E through point F to point A, substantially all of the energy which was stored in the core of the transformer between times $t_1$ and $t_2$ is returned and stored in capacitors 48-51. Capacitors 40 and 41 deliver substantially the same amount of energy to the transformer each time the silicon controlled rectifier 33 is rendered conductive so that the amount of energy delivered to filter capacitors 48-51 and the voltage across these capacitors is determined by the frequency of the signals applied to the gate of rectifier 33. A more detailed description of the operation of the switching regulator can be found in the U.S. Pat. No. 3,518,526 by Luther L. Genuit, issued June 30, 1970, entitled "Switching Regulator."

Capacitors 40 and 41 also provide a predetermined quantity of energy to the transformer 26 each time silicon controlled rectifier 34 is rendered conductive. At time $t_5$ a pulse from the trigger generator 17 renders silicon controlled rectifier 34 conductive so that a current $I_2$ flows from the upper plate of the capacitor 41 to the primary winding 30, from anode to cathode of rectifier 34 to the lower plate of capacitor 41. Current $I_2$ through the primary winding and the voltages impressed across this winding cause the operating point of the characteristic curve in FIG. 2 to move from point A through point C to point D and cause a predetermined quantity of energy to be stored in the core of transformer 26. When silicon controlled rectifier 34 is rendered nonconductive this energy is transferred through secondary winding 31 causing a current $I_4$ to charge capacitors 48 and 50 as described above.

The value of the voltage between output terminal 54 and ground is controlled by the control circuit 16. The value of the voltage between output terminal 53 and ground is controlled by the sense amplifier 13, the driver amplifier 12 and the equalizer circuit 11. Sense amplifier 11 includes an operational amplifier 81 and a voltage divider comprising resistors 83 and 84. Operational amplifier 81 may be any one of several types, such as the LM301A which is available from several sources. A description of the LM301A may be found in the book "Linear Integrated Circuits" 1971, by National Semiconductor Corporation, Santa Clara, Calif. The ratio of the amplitudes of the voltages between terminals 53 and 54 and ground is determined by the values of resistors 83 and 84. For example, when the value of resistor 83 is equal to the value of resistor 84 the positive output voltage at terminal 53 has the same value as the negative voltage at output terminal 54, i.e. when the voltage at terminal 53 is a +2 volts the voltage at terminal 54 is a −2 volts. When the value of resistor 83 is twice the value of resistor 84 the positive value of the voltage at terminal 53 is twice the negative value of voltage at terminal 54.

The amount of voltage across capacitors 50 and 51 is controlled by controlling the frequency of the trigger signals which control circuit 16 applies to the gates of silicon controlled rectifiers 33 and 34. The error amplifier 19 detects any change in voltage across capacitor 51 and provides a signal current whose value is determined by the change in voltage across capacitor 51. The signal current from the error amplifier 19 causes the rate generator 18 to develop pulses having a frequency which is determined by the value of the current from the amplifier 19. Pulses from the rate generator cause trigger generator 17 to develop trigger pulses for the switching regulator. When an increase in the amount of current drawn by a load 89 connected between output terminal 54 and ground in FIG. 1 causes the value of the output voltage to fall below a predetermined reference level, the frequency of the signals from trigger generator 17 increases. This increase in the frequency of the output signals causes an increase in the rate of energy delivered to the filter capacitors and increases the voltage at the output terminal 54 of the power supply so that this output voltage is substantially constant even when the current drawn from this power supply varies over a wide range of values.

In prior art power supplies having dual output voltages any unbalanced currents to the loads may cause the relative values of the output voltages to change. The present invention alleviates the disadvantages of the prior art supplies by diverting any unbalanced currents through the equalizer circuit 11. When two loads require different voltages one load is connected between terminal 53 and ground (FIG. 1) and the other load is connected between output terminal 54 and ground. When the current in load 88 of FIG. 1 is equal to the current in load 89, a current $I_8$ flows from terminal 53 through loads 88 and 89 to terminal 54. Current in the equalizer circuit 11 is not needed to maintain the normal values of voltage across loads 88 and 89.

When the current required in load 88 is greater than the current required in load 89 the additional current for load 88 is provided by the equalizer circuit 11. When the impedance of load 88 decreases the current required in load 88 increases. The decrease in impedance of load 88 causes the voltage across load 88 to decrease and causes the voltage at the output terminal 53 to decrease. A decrease in voltage at terminal 53 causes a decrease in the voltage at the input lead of operational amplifier 81 and a decrease in the voltage at the output lead of amplifier 81. The decrease in the voltage at the output lead of amplifier 81 is coupled through diodes 78 and 79 to the base of transistor 61 thereby rendering transistor 61 conductive. When transistor 61 is rendered conductive the current through transistor 61 causes transistor 60 and 58 to be rendered conductive. When transistor 58 is rendered conductive a portion of the current flowing through load 88 flows from ground through resistor 65 and transistor 58 to the negative bus bar 22. The current through transistor 58 causes a decrease in current through load 89 which causes a slight decrease in voltage across load 89 and a decrease in voltage at terminal 54. The decrease in voltage at terminal 54 causes error amplifier 19 to provide a signal current to rate generator 18. The signal current causes an increase in the frequency of the pulses from rate generator 18 and from trigger generator 17. The increase in frequency of the pulses from the trigger generator 17 causes an increase in the firing rates of silicon controlled rectifiers 33 and 34 in the switching regulator and causes the voltages at output terminals 53 and 54 to remain at substantially the normal values.

When the current required in load 89 is greater than the current required in load 88 the additional current is also provided by the equalizer circuit 11. When the impedance of load 89 decreases the current required in load 89 increases. The decrease in impedance of load 89 causes the voltage across load 89 to decrease and causes the voltage at terminal 54 to decrease. The decrease in voltage at terminal 54 causes the frequency of the pulses from control circuit 16 to increase and causes the voltage at terminal 53 to increase. An increase in the voltage at terminal 53 causes an increased voltage on the input lead of amplifier 81 and an increase on the output lead of amplifier 81. The increased voltage on the output lead of amplifier 81 causes transistors 59 and 57 to be rendered conductive so that current $I_5$ flows through resistor 64 and transistor 57 to ground through load 89 to the output terminal 54. This additional current through load 89 causes the voltage across loads 88 and 89 to return to the normal value of output voltage.

Thus, whenever additional current is required by load 88 or load 89 this additional current flows in a portion of the equalizer circuit 11. The switching regulator provides the additional current by providing an increase in the rate at which energy is transferred from the input terminals to the output terminals of the switching regulator. When equal amounts of additional current is required by both load 88 and load 89 a decrease in voltage at terminal 54 causes the switching regulator to provide more current $I_8$ through these loads.

While the principles of the invention have now been made clear in an illustrative embodiment, there will be many obvious modifications of the structure, proportions, materials and components without departing from those principles. The appended claims are intended to cover any such modifications.

What is claimed is:

1. A dual voltage regulator: for use with a switching regulator having first and second voltage output terminals and a ground terminal, said dual regulator comprising:

a voltage divider having first and second input leads and an output lead, said first input lead of said divider being connected to said first output terminal of said switching regulator, said second input lead of said divider being connected to said second output terminal of said switching regulator;

an operational amplifier having first and second input leads and an output lead, said first input lead of said operational amplifier being connected to said output lead of said divider, said second input lead of said operational amplifier being connected to said ground terminal;

first, second, third, fourth and fifth transistors each having a base, a collector and an emitter, said collectors of said first and said third transistors being coupled to said first output terminal, said collectors of said second and said fourth transistors being coupled to said ground terminal, said emitters of said first and said fifth transistors being connected to said ground terminal, said emitter of said second transistor being connected to said second terminal of said switching regulator, said base of said first transistor being connected to said emitter of said third transistor, said base of said second transistor being connected to said emitter of said fourth transistor, said base of said fourth transistor being connected to said collector of said fifth transistor; and first, second, third and fourth resistors, said first resistor being connected between said ground terminal and said emitter of said third transistor, said second resistor being connected between said second terminal and said emitter of said fourth transistor, said third resistor being connected between said second terminal and said collector of said fifth transistor, said fourth resistor being connected between said second terminal and said base of said fifth transistor, said output lead of said operational amplifier being coupled to said bases of said third and said fifth transistors.

2. A dual voltage regulator for use with a switching regulator having first and second output terminals and a ground terminal, said dual regulator comprising:
   a voltage divider having first and second input leads and an output lead, said first input lead of said divider being connected to said first output terminal of said switching regulator, said second input lead of said divider being connected to said second output terminal of said switching regulator;
   first and second amplifiers each having first and second input leads and an output lead, said first input lead of said first amplifier being connected to said output lead of said divider, said second input leads of said first and said second amplifiers being connected to said ground terminal, said first input lead of said second amplifier being connected to said second output terminal of said switching regulator;
   a rate generator;
   a trigger generator, said rate generator being connected between said trigger generator and said output lead of said second amplifier, said trigger generator being connected to said switching regulator;
   an equalizer circuit having first and second signal input leads, said equalizer circuit being connected between said first and said second output terminals of said switching regulator, said equalizer circuit being connected to said ground terminal; and
   means for coupling said first and said second signal input lead of said equalizer circuit to said output lead of said first amplifier.

3. A dual voltage regulator as defined in claim 2 wherein said equalizer circuit includes:
   first and second transistors each having a base, a collector and an emitter, said emitter of said first transistor being connected to said ground terminal, said base of said first transistor being connected to said first signal input lead of said equalizer circuit, said emitter of said second transistor being connected to said second output terminal of said switching regulator, said collector of said first transistor being coupled to said ground terminal, said base of said second transistor being connected to said second signal input lead of said equalizer circuit.

4. A dual voltage regulator as defined in claim 2 wherein said equalizer circuit and said means for coupling include:
   first, second, third, fourth and fifth transistors each having a base, a collector and an emitter, said collectors of said first and said third transistors being coupled to said first output terminal, said collectors of said second and said fourth transistors being coupled to said ground terminal, said emitters of said first and said fifth transistors being connected to said ground terminal, said emitter of said second transistor being connected to said second terminal of said switching regulator, said base of said first transistor being connected to said emitter of said third transistor, said base of said second transistor being connected to said emitter of said fourth transistor, said base of said fourth transistor being connected to said collector of said fifth transistor; and
   first, second, third and fourth resistors, said first resistor being connected between said ground terminal and said emitter of said third transistor, said second resistor being connected between said second terminal and said emitter of said fourth transistor, said third resistor being connected between said second terminal and said collector of said fifth transistor, said fourth resistor being connected between said second terminal and said base of said fifth transistor, said output lead of said first amplifier being coupled to said bases of said third and said fifth transistors.

5. A dual voltage regulator as defined in claim 2 wherein said equalizer circuit and said means for coupling include:
   first, second, third, fourth and fifth transistors each having a base, a collector and an emitter, said collectors of said first and said third transistors being coupled to said first output terminal, said collectors of said second and said fourth transistors being coupled to said ground terminal, said emitters of said first and said fifth transistors being connected to said ground terminal, said emitter of said second transistor being connected to said second terminal of said switching regulator, said base of said first transistor being connected to said emitter of said third transistor, said base of said second transistor being connected to said emitter of said fourth transistor, said base of said fourth transistor being connected to said collector of said fifth transistor;
   first, second, third and fourth resistors, said first resistor being connected between said ground terminal and said emitter of said third transistor, said second resistor being connected between said second terminal and said emitter of said fourth transistor, said third resistor being connected between said second terminal and said collector of said fifth transistor, said fourth resistor being connected between said second terminal and said base of said fifth transistor, said output lead of said first amplifier being coupled to said base of said third transistor; and
   a diode, said diode being connected between said base of said fifth transistor and said output lead of said first amplifier.

* * * * *